United States Patent [19]

Kayem et al.

[11] 4,241,430
[45] Dec. 23, 1980

[54] METHOD AND APPARATUS FOR DETERMINING THE LENGTH OF TUBULAR MEMBERS

[75] Inventors: Douglas J. Kayem, 711 Crossroads, Houston, Tex. 77079; Harold L. Reed, Richmond, Tex.

[73] Assignee: Douglas J. Kayem, Houston, Tex.

[21] Appl. No.: 1,828

[22] Filed: Jan. 8, 1979

[51] Int. Cl.³ .................................... G01S 15/10
[52] U.S. Cl. ............................ 367/115; 367/116; 367/902; 367/910; 367/140; 73/597
[58] Field of Search ............... 367/99, 108, 114, 115, 367/902, 908, 910, 140, 165, 173; 73/290 V, 592, 596, 597, 598; 181/105, 123, 124

[56] References Cited

U.S. PATENT DOCUMENTS

| 2,156,519 | 5/1939 | Walker | 181/105 |
| 3,267,414 | 8/1966 | Kritz | 367/173 X |
| 4,155,066 | 5/1979 | Galvin | 367/140 |
| 4,162,473 | 7/1979 | Utasi | 73/290 V X |

Primary Examiner—Richard A. Farley
Attorney, Agent, or Firm—Julian Clark Martin

[57] ABSTRACT

An improved method and apparatus for determining the length of a tubular member from a selected end thereof utilizing a hand-held probe wherein means are provided for producing sound pulses at the selected end, means are provided for detecting sound pulses at the selected end, means are provided for sensing the ambient temperature of the air in the vicinity of the inside of the tubular member being measured, means are provided for determining the time elapsed from the moment the sound pulse is generated until the acoustic wave comprising the returning sound pulse is detected by the detecting means, and means are provided for compensating for the increased travel time of the sound pulse occasioned by the sound pulse being reflected from the impedance differential surface set up by the other end of the pipe and spaced from the other end of the pipe.

13 Claims, 9 Drawing Figures

METHOD AND APPARATUS FOR DETERMINING THE LENGTH OF TUBULAR MEMBERS

OBJECTS AND SUMMARY OF THE INVENTION

This invention pertains to an improved method and apparatus for determining rapidly and accurately the length of an elongated, unobstructed tubular member, such as length of drill pipe or casing, and to determine the cumulative length of a plurality of such tubular members.

For inventory purposes and otherwise it is often desirable to determine the cumulative length of numerous joints of drill pipe or casing laid or piled horizontally in storage bins or on a flat bed truck or in any of many other numerous locations. In the past this has been accomplished by physically measuring each joint of pipe or by simply estimating the cumulative length by multiplying the number of joints of pipe by the average length of the range of pipe involved. However, physically measuring each joint of pipe is disadvantageous and estimating is not accurate due to the fact that drill pipe and casing are not accurately cut to preselected lengths.

It is an object of this invention to provide an improved method and apparatus for determining accurately and rapidly the length of a joint of drill pipe or casing and the cumulative length of a plurality of such joints of drill pipe or casing.

It is an object of this invention to provide an improved method and apparatus for determining the length of a joint of pipe wherein a hand-held apparatus or probe may be positioned in association with a joint of pipe at one end thereof and the length of that joint of pipe may be determined accurately and rapidly from that end of the pipe, and the cumulative length of a plurality of joints of pipe may be determined by repetitively positioning the hand-held apparatus in association with the ends of each of the plurality of joints of pipe.

The improved method and apparatus for determining the length of a joint of pipe, or the cumulative length of a plurality of joints of pipe, according to this invention includes: utilizing a hand-held apparatus to provide in communication with a selected end of the pipe means for producing a sound pulse of selected intensity, means for detecting the accoustic wave comprising the returning sound pulse after it has been reflected from the opposite end of the pipe, and means for sensing the ambient temperature of the air in the vicinity of the inside of the pipe; generating a sound pulse at the selected end of the pipe at a selected instant of time; detecting at the selected end of the pipe the accoustic wave comprising the returning sound pulse reflected by the opposite end of the pipe; determining how much time elapsed during the travel of the sound pulse; determining the velocity of sound in such air; and determining the length of the pipe responsive to the time elapsed from the instant the sound pulse is generated until the reflected portion of the sound pulse is detected and responsive to the velocity of sound in the air through which the sound pulse travels.

The improved method and apparatus for determining the length of a joint of pipe, or the cumulative length of a plurality of joints of pipe, according to this invention further includes a method and apparatus for compensating for the fact that the sound pulse is believed to be reflected not precisely from the other end of the pipe but from the impedance differential surface set up by the other end of the pipe and which is spaced from the other end of the pipe a distance believed to be a function of the diameter of the pipe.

DESCRIPTION OF THE PREFERRED EMBODIMENTS

Figure 1:
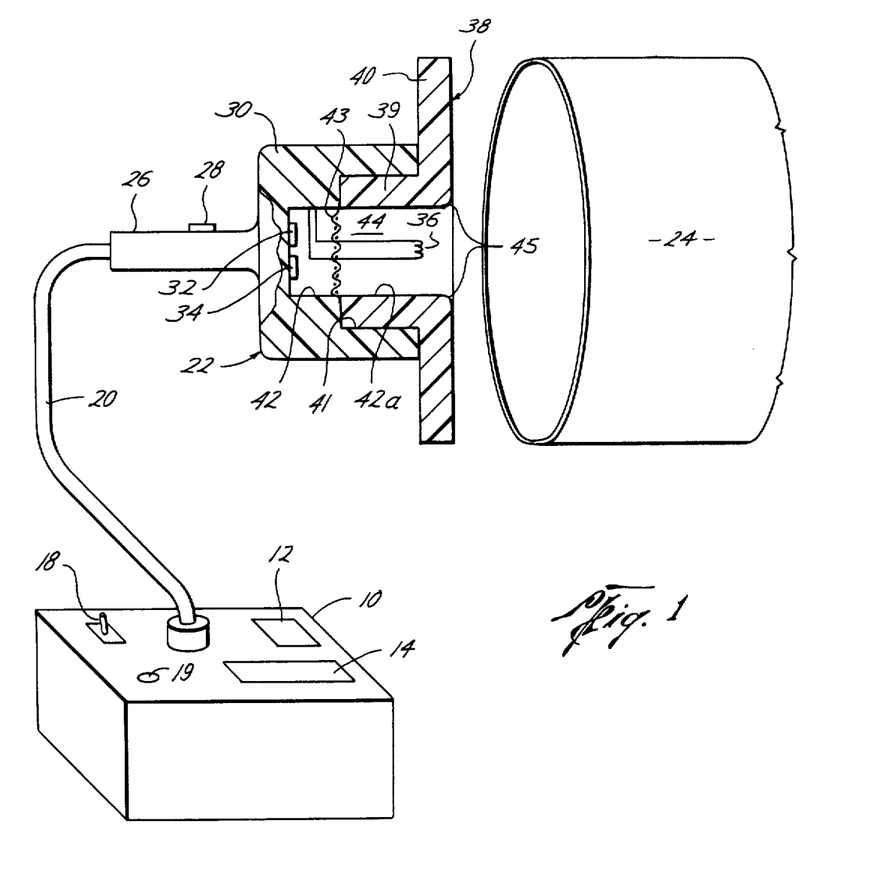
FIG. 1 depicts, partially in schematic isometric form and partially in sectional form, a preferred housing for the electronics and a preferred hand-held apparatus or probe for determining the length of tubular members according to this invention.

Referring to FIG. 1, which is a combination schematic isometric and sectional drawing of the preferred physical apparatus for determining the length of tubular members according to this invention, preferably a housing 10 is provided to receive the majority of the electrical components of the apparatus. Preferably the housing 10 has mounted therein a keyboard 12 and a printer 14 which will be described below. Power is provided preferably by a self-contained battery (not shown) so that the apparatus will be portable. A power disconnect switch 18 is positioned on the housing 10 to disconnect the power source from the electronics contained within the housing in a manner well known to those skilled in the art. Also preferably positioned on the housing 10 is a buzzer 19 for generating sounds to indicate the status of operation of the apparatus. The housing 10 is in electrical communication by means of a conduit 20 with a means 22 for producing and detecting sound, sometimes referred to herein as the hand-held apparatus or probe 22. However, if the electronic technology is now or hereafter becomes developed to the state that the electrical components which will hereinafter be described as fitting within the housing 10 can be minaturized to the point they could all fit within the hand-held probe 22, then preferably the apparatus according to this invention should be constructed that way.

The hand-held probe 22 for producing and detecting sound, shown to be in physical proximity with a selected end of a length of pipe 24, preferably comprises a handle 26 with a push button 28 mounted thereon and a body 30 within which is mounted a means 32 for generating a sound pulse, a means 34 for detecting accoustic waves created by the reflected sound pulse, and a means 36 for determining the ambient temperature of the air through which the sound is traveling. These devices will be described in more detail below.

A coupling means 38, preferably comprising a cylinder 39 with an outwardly extending flange 40 secured thereto, is coupled to the body 30, such as by friction contact within a receiving cavity 41 formed within the body 30, and functions to physically contact the end of the length of pipe 24 and place in fluid communication with the interior of the pipe 24 the means 32 for generating sound pulses, the means 34 for detecting the accoustic waves created by the reflected sound pulse, and the means 36 for determining the air temperature.

Preferably the body 30 of the probe includes an inner cavity 42 in which are mounted the means 32 for generating sound pulses and the means 34 for detecting returning accoustic waves. A wire mesh screen 43 or the like preferably is secured across the face of the inner cavity 42 to prevent debris from contacting the means 32 for generating sound pulses and the means 34 for detecting returning accoustic waves. Preferably the means 36 for determining the air temperature is mounted within the body 30 of the probe 22 and extends outwardly into the receiving cavity 41 a selected distance whereby the means 36 for detecting the air temperature approaches the edge of the flange 40 of the coupling means 38.

Preferably different sizes of coupling means 38 are provided to take into account the different diameters of the pipe 24 that may be tested. For example, a coupling means 38 with a 6" diameter flange may be utilized to test pipe from 4½" to 6" in diameter while a coupling means 38 having a 2⅜" flange may be utilized to test 2½" to 2⅜" pipe. However, each of the various coupling means 38 preferably utilizes the same size cylinder 39 to fit within the receiving cavity 41 of the body 30 so that each of the cylinders 39 will have an inner diameter 42a that matches the diameter of the inner cavity 42. As such, when the coupling means 38 is secured within the body 30 of the probe, there is provided an elongated annular space 44 into which extends the means 36 for determining the air temperature and through which may flow the sound pulses generated by the means 32 for generating sound pulses and through which may flow returning accoustic waves to be detected by the sound detection means 34.

We have discovered that when an apparatus according to this invention generates a sound pulse at a selected end of an open-ended pipe, the sound pulse will travel through the air in the pipe to the opposite end of the pipe and, depending upon the characteristics of the pipe, sufficient of the sound pulse may be reflected by the open opposite end of the pipe and travel back through the air in the pipe to be detected by the sound detection means 34. It is believed that the change in impedance encountered by the sound pulse at the opposite open-end of the pipe is the phenomenon that results in the reflection of the sound. The more abrupt the change in the impedance, the more sound is reflected. It has been discovered empirically that the smaller the diameter of the pipe, the more abrupt the change in impedance. We have discovered that with pipes having a diameter of six inches or less, the change in impedance at the opposite end of the pipe is abrupt enough to effect sufficient reflection of the sound pulse without the pipe having to be covered at the open opposite end.

Figure 6A:
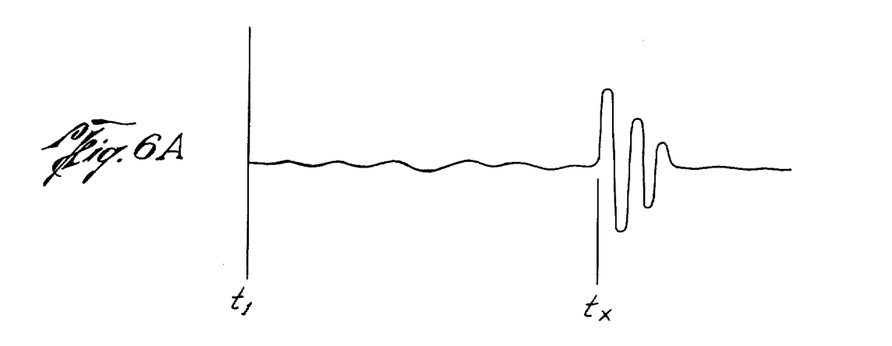
FIG. 6a illustrates graphically in the form of amplitude versus time the accoustic wave comprising the returning sound pulse detected by the sound detection means of the peferred apparatus according to this invention.

FIG. 6a illustrates graphically in the form of amplitude versus time the sound detected by the sound detection means 34 as a result of the sound pulse being reflected by the impedance characteristics of the open opposite end of the pipe. The sound pulse producing means 32 generate a sound pulse of selected intensity at time $t_1$. While the sound is traveling the length of the pipe and returning, the sound detecting means 34 detects only low level noise. But when the portion of the sound pulse that was reflected by the impedance characteristics of the open opposite end of the pipe returns to the selected end of the pipe, it returns in the form of an accoustic wave in which the initial cycle is of relatively large amplitude and after several cycles the accoustic wave attenuates.

We have discovered that when the sound pulse is reflected back from the open opposite end of the pipe, the reflection does not occur precisely at the end of the pipe. Particularly, referring to FIG. 2, we have discovered that utilizing the true time $t_x$ at which the initial cycle of the returning accoustic wave is detected by the sound detection means 34, yields an imprecise determination of the length of the pipe. There appears to be a reflecting surface positioned a short distance beyond the open opposite end of the pipe. We believe this reflecting surface is probably dome-shaped and is the surface where the change of impedance occurs. That reflecting surface shall be referred to herein as the "impedance differential surface". We have found empirically that the point beyond the end of the pipe where the impedance differential surface exists appears to be a function of the diameter of the pipe. For this reason, determining the time elapsed for the travel of the sound pulse by subtracting $t_1$ from $t_x$ shown in FIG. 6a yields produces a reading that shows the pipe to be longer than it actually is. Therefore, as will hereinafter be described, the preferred method and apparatus according to this invention provides means for compensating for the increased travel time of the sound pulse occasioned by the impedance differential surface being spaced from the end of the pipe some relatively short distance beyond the open opposite end of the pipe.

Figure 2:
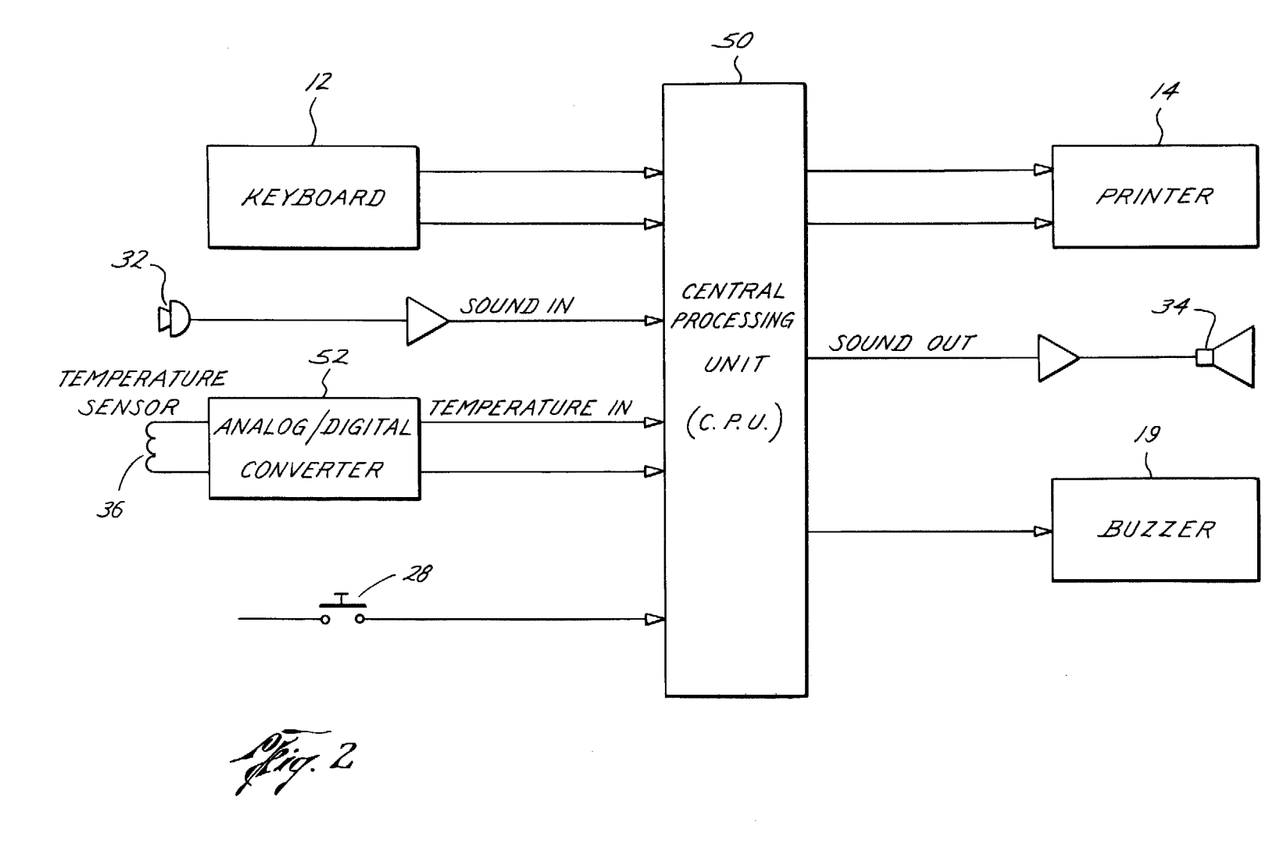
FIG. 2 is a schematic diagram of the functions of the certain of the electrical circuitry of the preferred method and apparatus for determining the length of tubular members according to this invention.

FIG. 2 illustrates schematically the functional aspects of the electronic circuitry of the preferred method of and apparatus for determining the length of tubular members according to this invention. Referring to FIG. 2, the preferred method of and apparatus for determining the length of tubular members according to this invention comprises a central processing unit 50 which receives the data input thereto, processes such data in accordance with preselected programs and instructions, and outputs the processed data. Coupled to the central processing unit 50 is the keyboard 12 which contains a plurality of keys through which the operator of the apparatus can control the operation of the apparatus. Also coupled to the central processing unit 50 is the printer 14 which receives data output by the central processing unit 50 and displays it in a form readable to the operator of the apparatus.

The means 32 for producing a sound pulse is coupled to the central processing unit 50 and functions to create, responsive to control signals supplied by the central processing unit, a sound pulse of selected intensity at a selected instant of time. Also coupled to the central processing unit 50 is the means 34 for detecting the returning accoustic wave created by the sound pulse being reflected by the impedance differential surface set up by the open opposite end of the tubular member and which has returned through the air inside the tubular member to the sound detection means 34.

The temperature sensor apparatus 36 senses the ambient temperature of the air in the vicinity of the inside of the tubular member and the analog electrical signal generated by such temperature sensor 36 is converted to digital data by the analog-to-digital converter 52 and such data is provided to the central processing unit 50.

The buzzer 19 is used to communicate the status of the operation of the apparatus to the operator. The central processing unit 50 preferably is programmed to cause the buzzer 19 to produce a short beep-beep when the instrument is ready to make another measurement, to produce a longer beep-beep when the instrument has finished measuring to inform the operator that the probe may be moved from the end of the one pipe and placed next to the end of another pipe, and a beep-beep-beep series as a general questioning signal to the operator in the event the operator enters commands through the keyboard that are not understood by the central processing unit 50.

The pushbutton 28 is electrically coupled to the central processing unit 50 and provides the electrical signal which causes the central processing unit 50 to commence performing its preprogrammed functions.

Figure 3:
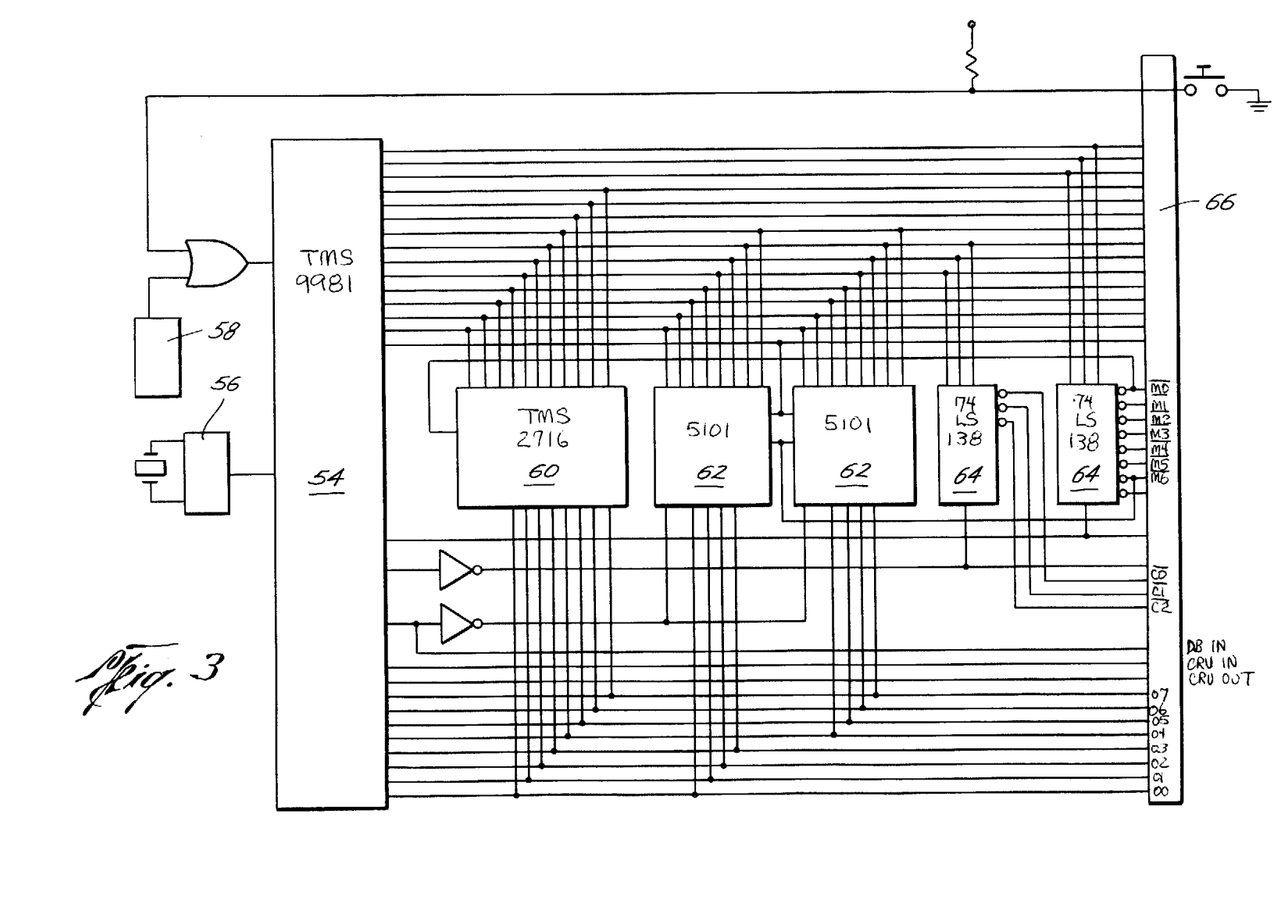
FIG. 3 is a diagram of the preferred central processing unit circuitry of the preferred apparatus for determining the length of tubular members according to this invention.
Figure 4:
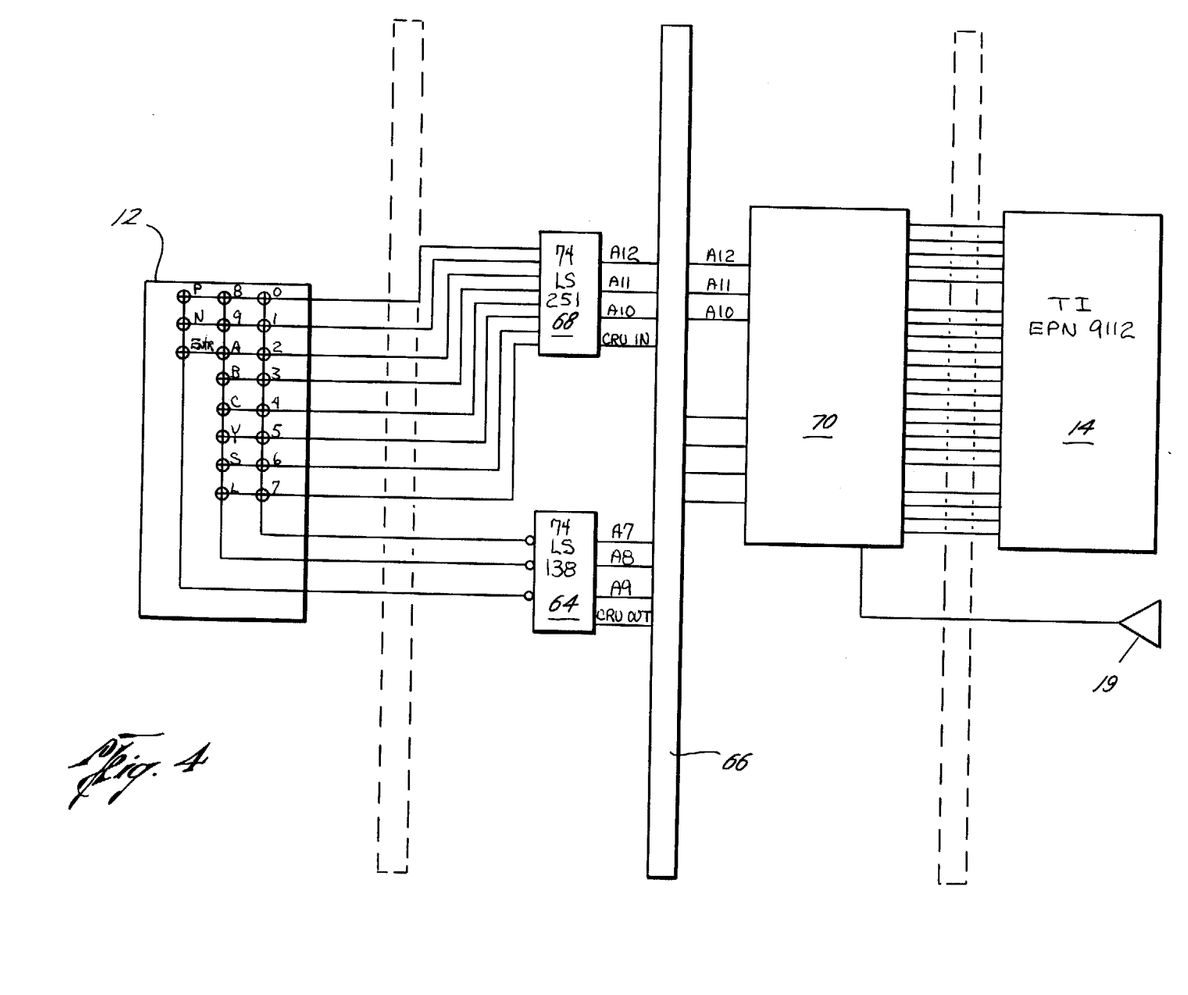
FIG. 4 is a diagram of the preferred keyboard and printer circuitry of the preferred apparatus for determining the length of tubular members according to this invention.
Figure 5:
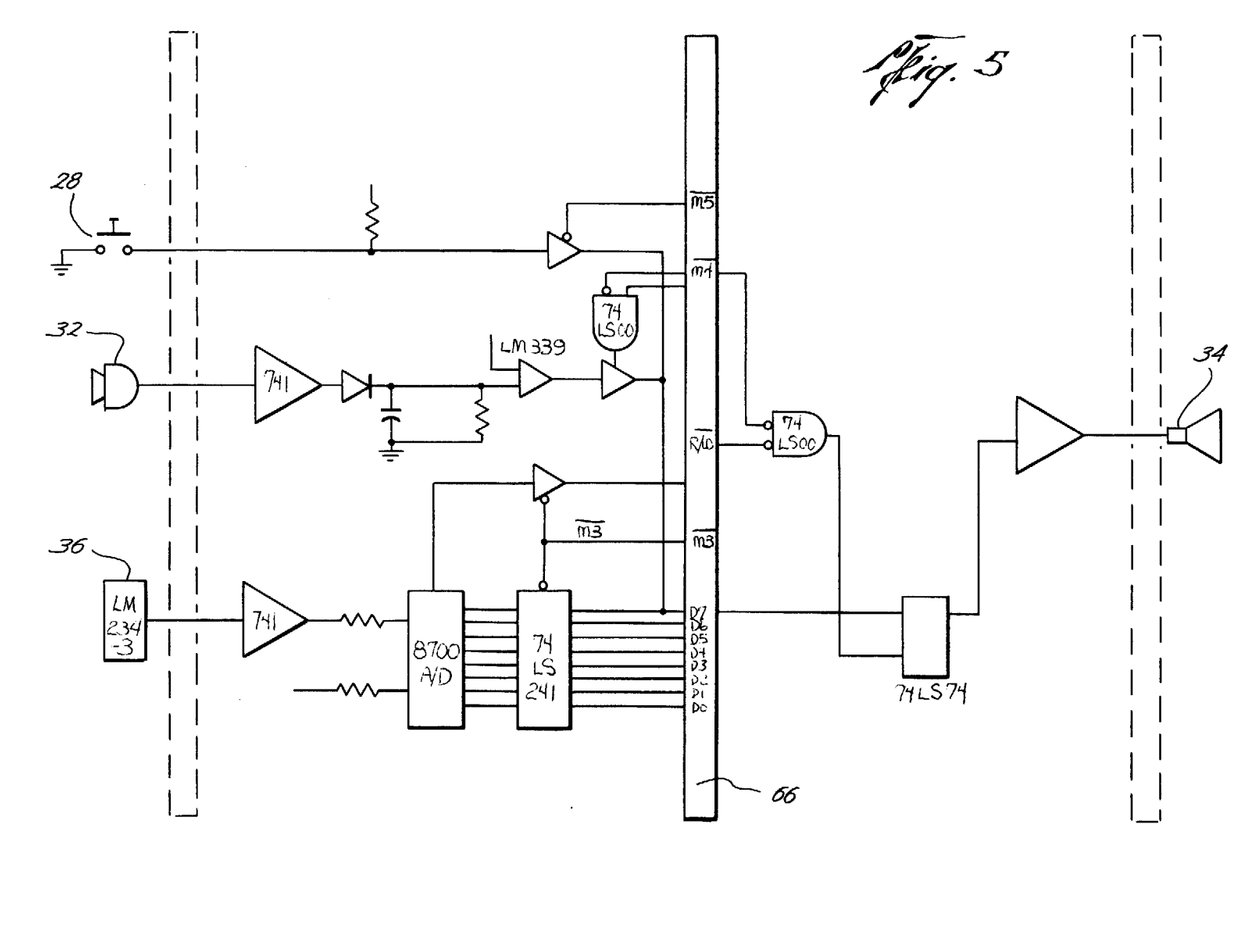
FIG. 5 is a diagram of the preferred circuitry for the means for determining the ambient temperature of the air, the means for producing the sound pulse, and the means for detecting the returning sound pulse, of the preferred apparatus for determining the length of tubular members according to this invention.

Although FIG. 2 has described certain of the functions of the preferred electrical circuitry of the apparatus according to this invention as being separate and distinct devices, the preferred electrical circuitry for practicing this invention combines certain of the described functions into integrated chips or boards. FIGS. 3, 4 and 5 describe the preferred electrical and electronic components for the improved method and apparatus according to this invention.

FIG. 3 is a description of the preferred central processing unit 50. The central processing unit 50 preferably comprises a Texas Instrument TMS 9980 or 9981 micro-processor 54. Coupled to the micro-processor chip 54 is a clock generator means 56, such as a standard crystal controlled oscillator circuit well known to those skilled in the art, and a power-on reset means 58, such as a standard one-shot device well known to those skilled in the art. Also coupled to the micro-processor chip 54 in a manner well known to those skilled in the art is a means which stores the instructions or programs for operating the micro-processor 54. Preferably this is a Texas Instruments TMS 2716 erasable programmable memory, designated in FIG. 3 by the numeral 60. The erasable programmable memory chip 60 contains all of the programs for operating the micro-processor 54 and such programs are stored therein whether the power is on or off. There are also preferably coupled to the micro-processor 54 and the erasable programmable memory 60 certain read/write memories 62, such as Intel 5101 RAMS, which are used for work space and cumulative sums and for other temporary storage of information. The content of these read/write memories is lost when the power is turned off. Also coupled to the micro-processor 54 and the apparatus described above are decoders 64, such as Texas Instruments 74 LS 138, which function to select the appropriate memory and output devices. All of the apparatus illustrated in FIG. 3 are shown to be connected to a panel connector 66 which allows the apparatus to be wired to the other boards to be described below.

Preferably the keyboard and the printer are included on one board, as illustrated in FIG. 4. Referring to FIG. 4, the keyboard 12 preferably is a keyboard matrix, such as one of any numerous commercially available products well known to those skilled in the art, coupled through a data selector/multiplexer 68, generically known in the industry by its 74 LS 251 nomenclature, and a decoder 64, generically known in the industry as 74 LS 138, to the back panel connector 66. Also coupled to the back panel connector 66 is a printer interface 70. Coupled to the printer interface 70 is the printer mechanism 14, such as a Texas Instruments EPN 9112, and the buzzer 19.

FIG. 5 illustrates the preferred board containing the electronics for the pushbutton 28, the means 32 for producing a sound pulse, the means 34 for detecting sound pulses, and the temperature sensor 36. As illustrated in FIG. 5, pushbutton switch 28, the means 32 for producing a sound pulse and the sound detection means 34 are standard devices, such as are well known to those skilled in the art, and are coupled to the back panel connector 66 through standard electronic circuitry, such as is well known to the skilled artisan. The temperature sensor apparatus 36, such as a National Semiconductor LM 234-3, is also coupled to the back panel connector 66 through standard devices, such as an analog-to-digital converter and a buffer, generically known in the industry by the 74 LS 241 nomenclature.

As will be apparent to those skilled in the art from the description provided above with respect to FIGS. 3, 4 and 5, buffers and other apparatus known to those skilled in the art are used in combination with the micro-processor 54 to decode the addresses of the other apparatus physically connected to the micro-processor from the other boards.

In operation, the coupling means of the probe is placed in association with a selected end of the pipe 24. The operator of the system operates the pushbutton-type switch 28 contained in the handle 26 of the probe means 22. Depressing the pushbutton switch 28 causes a signal to be transmitted to the central processing unit 50 which in turn generates a digital signal to drive the means 32 for producing sound pulse. When the sound detection means 34 for detecting sound pulse detects the returning accoustic wave caused by the reflected sound pulse, the sound is amplified, filtered and coupled through circuitry which converts it into a logic signal. As shown in FIG. 5, the logic signal is coupled to a comparator which generates a logic signal that can be read by the central processing unit 50 as if it were in a memory location. At the same time the central processing unit 50 scans the analog-to-digital converter 52 and reads the digital signal representative of the temperature detected by the temporary sensor 36 as if such data were in the memory of the apparatus.

Due to the high speed at which the central processing unit 50 and the ancillary components operate, it is preferred to program the central processing unit 50 to operate repetitively on each pipe until it obtains two readings which are precisely the same, with a limit of ten repetitions. If the apparatus has been unable to obtain two identical readings in ten attempts, then the central processing unit causes the printer to print out some notice such as "noise" whereby the operator checks the apparatus and the pipe to see what the problem is.

When the reading of the length of the pipe is complete, the central processing unit, depending upon the commands input thereto by the operator through the use of the keyboard, performs the desired function and then returns to ready position to wait for the operator to command another reading or another activity. Depending upon the commands of the operator, the apparatus may display on the printer 14 the length of that particular joint of pipe, or sum the length of that particular joint of pipe with the previous measurements for a particular lot and display the summed total.

The central processing unit, which has clocking data input thereto, determines the length of time that elapses as the sound pulse travels in the air inside the pipe along the length of the pipe, is reflected by the impedance differential surface spaced a relatively short distance from the open opposite end of the pipe, and returns through the air inside the pipe to the means 34 for detecting sound pulses. The central processing unit is programmed to determine the length of the pipe by solving the following equation:

$$L = V_{T_o}\sqrt{(T_K \div 273.15)} \cdot \frac{T}{2} - 2L_K \quad (1)$$

wherein L is the length of the pipe, $V_{T_o}$ is the velocity of sound at 0 degrees Centigrade or 273.15 degrees Kelvin, $T_K$ is the temperature in degrees Kelvin detected by the temperature detecting device, and T is the time that elapses as the sound pulse travels from the sound producing means 32 along the length of the pipe and returns along the length of the pipe to the sound detection means 34, and $L_K$ is a constant equal to the distance the sound producing means 32 and the sound detection means 34 are spaced from the selected end of the pipe.

Figure 6B:
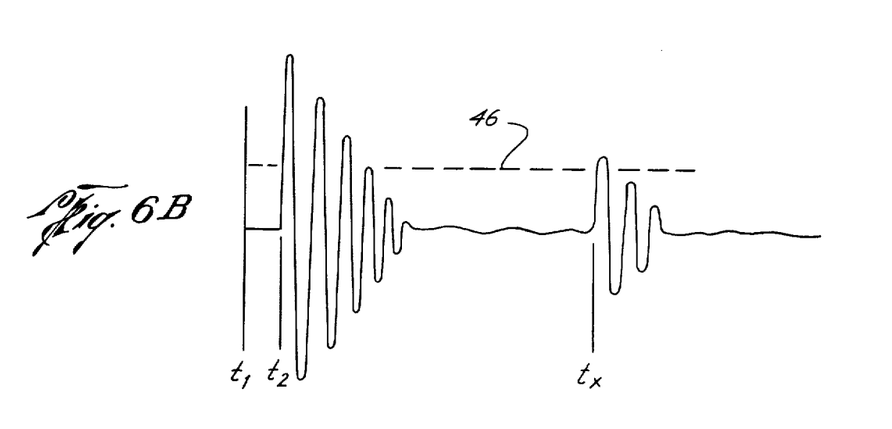
FIG. 6b illustrates graphically in the form of amplitude versus time the accoustic waves detected by the sound detection means of the preferred apparatus according to this invention when an impedance chamber is utilized to compensate for the impedance differential surface being spaced from the open opposite end of the tubular member.

The preferred apparatus and method according to this invention for compensating for the increased travel time of the sound pulse occasioned by the impedance differential surface being spaced from the open opposite end of the pipe, comprises electronic means in the central processing unit 50 which alters the time T in the above equation (1) to take into account such time difference. We have discovered that by recessing the sound producing means 32 and the sound detection means 34 in the probe and providing the elongated annular space 44 through which the sound may flow to and from the air in the pipe, there is created a miniature elongated impedance chamber similar to an open-ended pipe segment. We have discovered that when the open end 45 of the elongated probe impedance chamber is smaller in diameter than the diameter of the pipe, the open end of the probe impedance chamber reflects a portion of the generated sound pulse and the sound detection means 34 detects such reflected sound. Similarly to the detected sound reflected from the impedance differential surface set up by the open opposite end of the pipe, the reflection of the sound pulse by the open end of the probe impedance chamber creates an accoustic wave of several cycles which thereafter attenuates. Referring to FIG. 6b illustrates graphically in the form of amplitude versus time representative accoustic waves detected by the sound detection means 34 recessed in a probe having a probe impedance chamber according to this invention. The sound pulse is generated at time $t_1$. At time $t_2$ the sound detection means 34 detects the initial cycle of the returning accoustic wave caused by a portion of the sound pulse being reflected by the open end 45 of the probe impedance chamber. This accoustic wave requires several cycles to attenuate. At time $t_x$ the sound detection means 34 detects the initial cycle of the returning accoustic wave created by the generated sound pulse being reflected from the impedance differential surface spaced from the open opposite end of the pipe 24. We have discovered that, given a constant size probe impedance chamber, the intensity of the accoustic wave created by the sound pulse being reflected from the open end 45 of the probe impedance chamber, that is, the number of cycles and the amplitude of the cycles, is a function of the diameter of the pipe with respect to which the coupling means is associated. It appears that irrespective of the length of the pipe being measured, the diameter of the pipe is characterized of the pipe which, when the coupling means has placed the elongated annular space 42 in fluid communication with the air inside the pipe, affects the impedance of the open end 45 of the probe impedance chamber and thereby affects the number of cycles and the amplitude of the cycles.

Figure 6C:
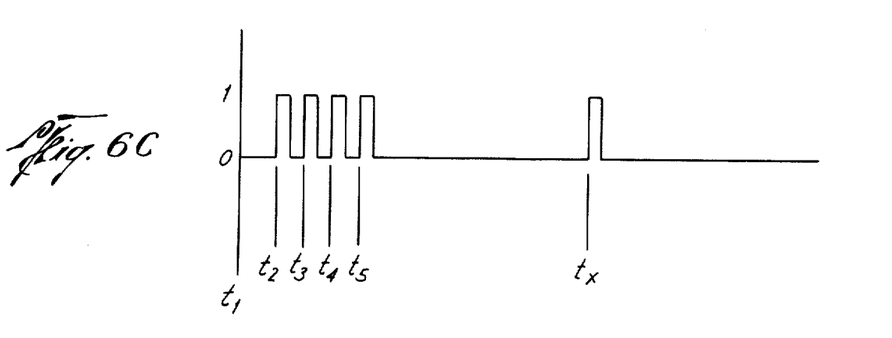
FIG. 6c illustrates graphically in the form of amplitude versus time the electrical logic signal generated by the preferred apparatus according to this invention responsive to those portions of the accoustic waves shown in FIG. 6b exceeding a selected amplitude.

If the electronic circuitry of the apparatus is constructed to amplify the signal generated by the sound producing means 32, filter the signal and convert it into a logic signal which is a "1" whenever the accoustic wave has an amplitude in excess of preselected amplitude 46 shown in FIG. 6b and is a "0" whenever its amplitude is less than the preselected amplitude 46, then an electrical logic signal is generated similar to that illustrated in FIG. 6c.

As shown in FIG. 6c, in the preferred compensation means according to this invention the logic circuitry is adjusted whereby the selected threshold amplitude 46 is less than the amplitude of the initial cycle but greater than the amplitude of the subsequent cycles of the accoustic wave caused by a portion of the sound pulse being reflected from the impedance differential surface spaced from the open opposite end of the pipe. Since the intensity of the accoustic wave caused by a portion of the sound pulse being reflected by the open end 45 of the probe impedance chamber is generally greater than the intensity of the accoustic wave caused by a portion of the sound pulse being reflected by the impedance differential surface spaced from the open opposite end of the pipe, more of the cycles of the former are detected. Preferably the central processing unit 50 is programmed to commence counting, responsive to clocking data input to it by the clock generator means 56, at the time $t_1$ when the sound producing means 32 generates the sound pulse and to determine the number of counts between that instant of time $t_1$ and the time $t_2$ when the central processing unit is informed by the logic signal that the sound detection means 34 has detected the first cycle of the accoustic wave created by a portion of the sound pulse being reflected the end 45 of the probe impedance chamber. This count is recorded in the memory of the central processing unit. The central processing unit preferably then commences counting again and counts until it is informed by the logic signal that a second cycle has been detected at time $t_3$. The central processing unit preferably repeats this procedure until a preselected period of time has elapsed without any more cycles being detected. For example, utilizing the particular central processing unit 50 described above and the particular nomenclature described above and with the central processing unit counting each crest and trough of each cycle, when a sound pulse is generated by the probe 22 at the selected end of a forty-five foot long length of #2½" pipe, it has been found empirically that the apparatus detects three distinct cycles. A count of nineteen is reached between the time $t_1$ the sound pulse was generated and the time the first cycle is detected. A count of forty-three is reached between the time of detection of the first cycle and the time of detection of the second cycle. A count of 1,481 is then reached between the tune the second cycle and the last cycle. The first two cycles are part of the accoustic wave caused by a portion of the sound pulse being reflected by the end 45 of the probe impedance chamber and the third cycle is the initial cycle of the accoustic wave caused by a portion of the sound pulse being reflected from the open opposite end of the pipe. By way of another example, it has been found that when a sound pulse is generated by a probe apparatus at a selected end of a 6.85 foot long length of #6 pipe, six distinct cycles are detected and the counts reached with respect to the six logic signals are as follows: 20, 36, 35, 48, 40 and 104.

The computer cycle time $C_T$ of the central processing unit 50 that elapses from the time $t_1$ the sound pulse was generated until the time $t_x$ the last cycle is detected can be expressed as follows:

$$C_T = (S_T \cdot K_1) + (N \cdot K_2) \quad (2)$$

where $S_T$ is the sum of the counts and $K_1$ is a constant which is a function of the speed at which the central processing unit and the operational and application programs operate, and N is the number of cycles detected in the accoustic wave caused by a portion of the sound pulse being reflected from the end 45 of the probe impedance chamber and $K_2$ is a constant empirically determined based upon the speed at which the central processing unit and the operational and application programs operate and adjusted if necessary to improve the accuracy of the apparatus.

It can now be observed the sum of the counts $(S_T \cdot K_1)$ is equal to the computer cycle time $C_T$ minus a number $(N \cdot K_2)$ which is function of the number of cycles detected in the accoustic wave caused by a portion of the sound pulse being reflected from the end 45 of the probe impedance chamber, which in turn is believed to be a function of the diameter of the pipe to which the probe impedance chamber is coupled. And the distance the impedance differential surface is spaced from the open opposite end of the pipe is also believed to be a function of the diameter of the pipe. We discover that when the number of cycles N multiplied by the constant $K_2$ based on the speed of the computer described above was subtracted from the computer cycle time $C_T$, the resulting computer cycle time $C_T$ when converted to real time and supplied into equation (1) yielded a pipe length slightly less than the actual pipe length. Therefore, the constant $K_2$ or the magnitude of the threshold amplitude 45 should be adjusted slightly so that the number of cycles N multiplied by the constant $K_2$ and added to the sum of the counts $(S_T \cdot K_1)$ yields a computer cycle time $C_T$ precisely equal to the travel time of the sound compensated for the distance the impedance differential surface is spaced from the open opposite end of the pipe.

It has also been found that without losing very much accuracy, the element $(N \cdot K_2)$ in equation (2) can be replaced with a constant A which varies depending on the equation $S_1/S_2$ where $S_1$ is the time elapsed from $t_1$ to $t_2$ in FIG. 6c and $S_2$ is the time elapsed from $t_2$ to $t_3$. Depending upon whether $S_1/S_2$ is greater than or less than an empirically determined value, the various diameters of pipe can be placed in different categories and a different constant A applied in the following equations:

$$C_T = A(S_T \cdot K_1) \quad (3)$$

The computer cycle time $C_T$ can then be described as a function of real time T as follows:

$$C_T = 2 \cdot T \cdot F_c \quad (4)$$

wherein T is real time, $F_c$ is the frequency of the clock generating means utilized to drive the central processing unit, and the number 2 is included within the equation because the central processing unit in this particular application is counting during the passing of both the initial pulse and its reflection.

We have found that the preferred method and apparatus described above, which utilizes a central processing unit that counts at the rate of 1.5 microhertz, or one operation every $1.5 \times 10^{-6}$ seconds, measures pipe having diameters varying from 2" to 8" and lengths from 1½ feet to 1000 feet to an accuracy of 0.03 foot. By utilizing a faster central processing unit, the accuracy of the reading can be improved.

An alternate method of adjusting the sum of the counts $(S_T \cdot K_1)$ in equation (3) to compensate for the impedance differential surface being spaced beyond the open opposite end of the pipe is for the operator of the apparatus to insert in each case the diameter of the pipe being measured and the central processing unit to apply a predetermined constant A for each different diameter of pipe.

Figure 7:
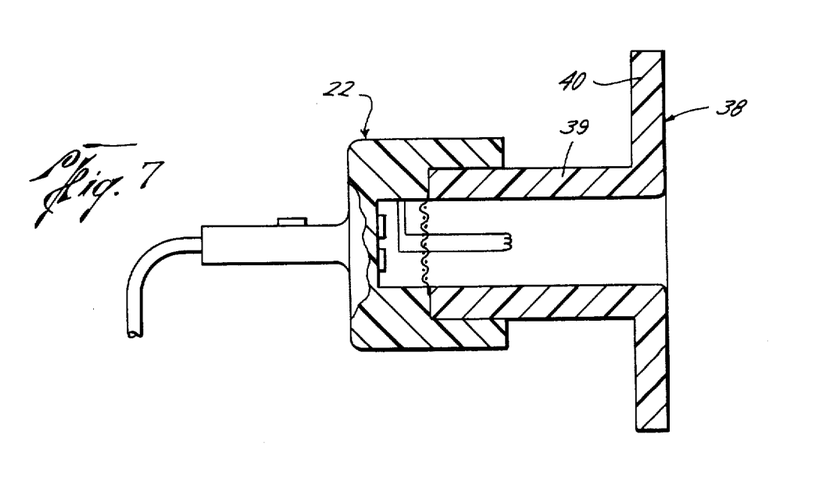
FIG. 7 depicts, partially in schematic isometric form and partially in sectional form, an alternative hand-held apparatus or probe for determining the length of tubular members according to this invention.

Another alternative method and apparatus according to this invention for compensating for the increased travel time occasioned by the impedance differential surface being spaced from the precise end of the pipe, is shown in FIG. 7. Preferably in this embodiment the coupling means 38 removably secured to the probe 22 is physically constructed to compensate for the change in travel time of the sound pulse occasioned by the diameter of the pipe to be measured. It can be determined empirically the approximate distance that the impedance differential surface is spaced beyond the open opposite end of a joint of pipe for pipes of various diameters. Thus, for example, a particular coupling means 38 could be utilized for all 6" diameter pipe and a different coupling means 38 could be utilized for all three-inch diameter pipe. Each coupling means would utilize a different length cylinder 39 which positions the sound producing means 32 and the sound detection means 34 with respect to a preselected base location chosen based on the smallest diameter pipe whereby the cylinder 39 generally becomes shorter and the sound producing means 32 and the sound detection means 34 generally move closer to the pipe as the diameter of the pipe increases and the impedance differential surface moves further beyond the open opposite end of the pipe. While this alternate embodiment of the method and apparatus according to this invention does not determine the length of pipe as accurately as the preferred embodiment of the method and apparatus according to this invention, the accuracy of this alternative embodiment is within one percent and for most practical purposes is quite efficient.

The invention shown has been described with reference to several particular embodiments. However, the circuitry and physical components may be arranged and constructed in different forms to accomplish the improved method and apparatus according to this invention. Therefore, it is believed the foregoing disclosure and description of the invention are illustrative and explanatory and various changes in the circuitry and components may be made within the scope of the appended claims without departing from the spirit of the invention.

What is claimed is:

1. An improved method of determining the length of an elongated tubular member from a selected end of such tubular member, including the steps of:

providing in fluid communication with the air inside the tubular member sound producing means, sound detecting means, and means for sensing the ambient temperature of the air;

sensing the ambient temperature of the air with the temperature sensing means;

causing the sound producing means to generate a sound pulse at a selected instant of time;

detecting with the sound detection means the portion of the sound pulse that traverses the length of the tubular member and is reflected by the impedance differential surface set up by the opposite end of the tubular member and returns; and determining the length of the tubular member responsive to the time of travel of the sound pulse, responsive to the difference, if any, in the time of travel of the sound pulse caused by the impedance differential surface being spaced from the opposite end of the tubular member, and responsive to the ambient temperature of the air through which the sound pulse travels.

2. An improved method of determining the length of an elongated tubular member from a selected end of such tubular member, including the steps of:

providing a hand-held probe to be placed at a selected location in association with the selected end of the tubular member, which hand-held probe includes sound producing means and sound detection means and means for sensing the ambient temperature of the air in the vicinity of the inside of the tubular member;

sensing the ambient temperature of the air in the vicinity of the inside of the tubular member;

producing at a selected instant of time a second pulse at a selected location in association with the selected end of the tubular member;

detecting at a selected location in association with the selected end of the tubular member the returning accoustic wave created by a portion the sound pulse traversing the length of the tubular member, being reflected by the impedance differential surface set up by the opposite end of the tubular member; and returning; and determining the length of the tubular member responsive to the time of travel of the sound pulse, responsive to the difference, if any, in the time of travel of the sound pulse caused by the impedance differential surface being spaced from the opposite end of the tubular member, and responsive to the ambient temperature of the air through which the sound pulse travels.

3. An improved method of determining the length of an open elongated tubular member from a selected end of such tubular member, including the steps of:

providing a means for producing and detecting sound at a selected location in association with the selected end of the tubular member and in fluid communication with the air inside the tubular member;

sensing the ambient temperature of the air in the vicinity of the tubular member;

producing a sound pulse at a selected instant of time at the selected location;

detecting at the selected location the returning accoustic wave caused by a portion of the sound pulse being reflected by the impedance differential surface set up by the open opposite end of the tubular member and determining the time at which the accoustic wave is detected;

compensating for the difference in time of travel of the sound occasioned by the impedance differential surface being spaced from the open opposite end of the tubular member; and determining the length of the tubular member responsive to the time of travel of the sound, responsive to the difference, if any, in time of travel of the sound caused by the means for producing and detecting sound being spaced from the selected end of the tubular member and the impedance differential surface being spaced from the open opposite end of the tubular member, and responsive to the ambient temperature of the air through which the sound travels.

4. An improved method of determining the length of an open elongated tubular member from a selected end of such tubular member according to claim 3, wherein the step of compensating for the difference in time of travel of the sound occasioned by the impedance differential surface being spaced from the open opposite end of the tubular member includes the additional step of:

modifying responsive to the impedance characteristics of the tubular member being measured the selected location at which the means for producing and detecting sound pulses are operated.

5. An improved method of determining the length of an open elongated tubular member from a selected end of such tubular member according to claim 3, wherein the steps of providing a means for producing and detecting sound at a selected location and of compensating for the difference in time of travel of the sound occasioned by the impedance differential surface being spaced from the open opposite end of the tubular member, include the additional steps of:

recessing the means for producing and detecting sound in an elongated impedance chamber which is in fluid communication with the air inside the pipe and which has an inner diameter less than the inner diameter of the pipe to be measured;

detecting at the selected location the returning accoustic wave caused by a portion of the sound pulse being reflected by the open end of the impedance chamber and determining the times of detection of those cycles of the accoustic wave which exceed a preselected threshold amplitude.

6. An improved method of determining the length of an open elongated tubular member from a selected end of such tubular member, including the steps of:

providing at a selected location in fluid communication with the selected end of the tubular member a means for producing and detecting sound pulses;

sensing the ambient temperature of the air in the vicinity of the inside of the tubular member;

producing at a selected instant of time a sound pulse;

detecting the returning accoustic wave caused by a portion of the sound pulse being reflected by the impedance differential surface set up by the open opposite end of the tubular member and determining the time elapsed during the travel of the sound;

compensating for the difference in time of travel of the sound occasioned by the impedance differential surface being spaced from the open opposite end of the tubular member; and determining the length of the tubular member by solving the following equation:

$$L = V_{T_0} \sqrt{(T_K - 273.15)} \cdot \frac{T}{2} - 2L_K$$

wherein L is the length of the tubular member, T is the time elapsed as the sound pulse travels to the impedance differential surface set up by the open opposite end of the tubular member and returns compensated for the distance the impedance differential surface is spaced from the open opposite end of the tubular member, $T_K$ is the temperature in degrees Kelvin of the ambient temperature of the air in the vicinity of the inside of the tubular member, $V_{T_0}$ is the velocity of sound at 273.15° Kelvin, and $L_K$ is the distance the means for producing and detecting sound is spaced from the selected end of the tubular member.

7. An improved method of determining the length of an open elongated tubular member from a selected end of such tubular member, including the steps of:

providing at a selected location in association with the selected end of the tubular member a hand held probe which includes a probe impedance chamber that places in fluid communication with the air inside the tubular member a means for producing sound, a means for detecting sound and a means for sensing the temperature of air;

causing the means for producing sound pulses to produce a sound pulse at a selected instant of time;

detecting the returning accoustic wave caused by a portion of the sound pulse being reflected by the open end of the probe impedance chamber;

detecting the returning accoustic wave caused by a portion of the sound pulse being reflected by the impedance differential surface set up by the open oposite end of the tubular member and determining the time at which the accoustic wave is detected;

sensing the ambient temperature of the air in the vicinity of the inside of the tubular member; and determining the length of the tubular member responsive to the time elapsed from the time the sound pulse is generated to the time of detection of the accoustic wave caused by a portion of the sound being reflected by the impedance differential surface, and responsive to the intensity of the accoustic wave caused by a portion of the sound being reflected by the open end of the probe impedance chamber, and responsive to the ambient temperature of the air through which the sound travels.

8. An improved apparatus for determining the length of an elongated tubular member from a selected end of such tubular member, including:

means for sensing the ambient temperature of the air in the vicinity of the inside of the tubular member;

means for producing a sound pulse at a selected instant of time and at a selected location in fluid communication with the air inside the pipe;

means for detecting at a selected location in fluid communication with the air inside the tubular member, the portion of the sound pulse that traverses the length of the tubular member, is reflected by the impedance differential surface set up by he opposite end of the tubular member, and returns; and means for determining the length of the tubular member responsive to the time of travel of the sound pulse, responsive to the difference, if any, of the time of travel of the sound pulse caused by the impedance differential surface being spaced from the opposite end of the tubular member, and responsive to the ambient temperature of the air through which the sound pulse travels.

9. An improved apparatus for determining the length of a tubular member from a selected end of such tubular member, comprising:

a hand-held probe means to be placed in contact with the selected end of the tubular member, such probe means including a means for producing a sound pulse for travel through the air inside the tubular member and including a means for detecting at least such portion of such sound as may be reflected by the impedance differential surface set up by the opposite end of the tubular member and may return to the hand-held probe means;

means for sensing the ambient temperature of the air in the vicinity of the inside of the tubular member;

means for determining the time elapsed as the sound pulse travels from the sound pulse producing means through the pipe, a portion of the sound pulse is reflected by the impedance differential surface set up by the open opposite end of the tubular member, and the accoustic wave caused by the reflected sound returns to the sound detecting means;

means for compensating for the difference in time of travel of the sound caused by the impedance differential surface being spaced from the open opposite end of the tubular member; and means for determining the length of the tubular member responsive to the elapsed travel time of the sound, responsive to the difference in time of travel of the sound caused by the impedance differential surface being spaced from the open opposite end of the tubular member, and responsive to the temperature of the air through which the sound pulse travels.

10. An improved apparatus for determining the length of a tubular member from a selected end of such tubular member, comprising:

a hand-held probe means to be placed in fluid communication with the selected end of the tubular member, such probe means including:

means for producing a sound pulse for travel through the air inside the tubular member, means for detecting such portions of the sound pulse as may be reflected by the impedance differential surface set up by the opposite end of the tubular member and may return to the hand-held probe means, means for sensing the ambient temperature of the air in the vicinity of the inside of the tubular member, and a removable coupling means for engaging the selected end of the pipe and placing the means for producing a sound pulse, the means for detecting the returning sound pulse, and the means for sensing the temperature of the air, in fluid communication with the air inside the pipe;

means for determining the time elapsed from the moment the sound pulse is generated by the sound pulse producing means until the returning sound pulse has been detected by the sound pulse detecting means; and means for determining the length of the tubular member responsive to the elapsed travel time of the sound pulse, responsive to the difference, if any, in the time of travel of the sound pulse caused by the impedance differential surface being spaced from the opposite end of the tubular member, and responsive to the ambient temperature of the air through which the sound pulse travels.

11. An improved apparatus for determining the length of a tubular member from a selected end of such tubular member, comprising:

hand-held probe means including a means for producing sound and a means for detecting sound;

coupling means removably secured to the hand-held probe for compensating for the difference of time of travel of the sound caused by the impedance differential surface set up by the open opposite end of the tubular member being spaced from the open opposite end of the tubular member;

means for sensing the ambient temperature of the air in the vicinity of the inside of the tubular member; and means for determining the length of the tubular member responsive to the time elapsed as the sound travels through the pipe, is reflected by the impedance differential surface set up by the open opposite end of the tubular member, and returns to the means for detecting sound pulses and responsive to the temperature of the air through which the sound pulse travels.

12. An improved apparatus for determining the length of an open elongated tubular member from a selected end of such tubular member, including:

a hand held probe which includes a probe impedance chamber that is in fluid communication with the air inside the tubular member when the hand-held probe is placed in contact with the selected end of the tubular member;

means for producing sound pulses mounted within the probe impedance chamber;

sound detection means mounted within the probe impedance chamber for detecting the returning accoustic wave caused by a portion of the sound pulse being reflected by the open end of the probe impedance chamber and for detecting the returning accoustic wave caused by a portion of the sound pulse being reflected by the impedance differential surface set up by the open opposite end of the tubular member;

temperature sensing means mounted within the probe impedance chamber for sensing the ambient temperature of the air in the vicinity of the inside of the tubular member; and means for determining the length of the tubular member responsive to the time elapsed from the time when the sound pulse is generated to the time of detection of the accoustic wave caused by a portion of the sound being reflected by the impedance differential surface, and responsive to the intensity of the accoustic wave caused by a portion of the sound being reflected by the open end of the probe impedance chamber, and responsive to the ambient temperature of the air through which the sound travels.

13. In combination with an apparatus with means for sensing the ambient temperature of the air in the vicinity of the inside of a tubular member and with means for determining the length of a tubular member responsive to the time of travel elapsed as sound travels through the tubular member, is reflected by the impedance differential surface set up by and spaced from the open opposite end of the tubular member, and returns, an improved hand-held probe apparatus for use in determining the length of an open elongated tubular member from a selected end of such tubular member, comprising:

an elongated probe impedance chamber having an inner diameter less than the inner diameter of the tubular member to be measured;

a flange secured to the elongated probe impedance chamber for contacting the selected end of the tubular member and placing the probe impedance chamber in fluid communication with the air inside the tubular member;

means for producing sound mounted within the probe impedance chamber and means for detecting sound mounted within the probe impedance chamber.

* * * * *